3,718,586
SOLVENT FOR CLEANING WELL BORES, FLOWLINES, ETC.
William C. Rollo, Box 756, and John D. Melancon, Rte. 1, Box 399, both of Winnie, Tex. 77665
No Drawing. Continuation-in-part of abandoned application Ser. No. 74,158, Oct. 21, 1970. This application Dec. 2, 1971, Ser. No. 204,351
Int. Cl. B01f 1/00; C23g 5/02
U.S. Cl. 252—8.55 B                 5 Claims

ABSTRACT OF THE DISCLOSURE

A solvent is provided for paraffin, waxy sludges and the like of petroleum origin. The solvent includes a liquid petroleum gas and a composition of a normally liquid aromatic. When the liquid petroleum gas is then combined with normally liquid aromatic, increased solvent properties are obtained by addition of a liquid petroleum sulfonate as well as a surfactant and ethylene glycol. The solvent may be used in processes for cleaning oil and gas well bores, flow lines, transmission lines and storage tanks.

CROSS-REFERENCE TO RELATED APPLICATIONS

This is a continuation-in-part of copending patent application Ser. No. 74,158, filed Oct. 21, 1970, now abandoned in the names of applicants hereunder, entitled Solvent for and Method of Cleaning Well Bores, Flowlines, Etc.

BACKGROUND OF THE INVENTION

In the production of oil or gas from a subterranean formation through a well bore leading to the surface of the Earth, difficulty is often encountered by reason of accumulation within the well bore of high molecular weight or high-viscosity hydrocarbons. For many reasons, these hydrocarbons such as paraffins, tars, waxes and/or sludge material, accumulate within the well bore and ultimately can result in plugging of the bore as well as flow and transmission lines associated with the well. These heavy hydrocarbon accumulations are generally solid or semi-solid at the conditions existing within the well bore or adjoining lines and reduce the size of the passageways through which the oil or gas must flow. Flow of oil or gas through the passageways is hindered and, in aggravated cases, accumulation of these heavy hydrocarbons can occur to extent that flow through the well bore or adjoining lines is completely restricted. Additionally, tanks used to store such material often become clogged with the same paraffin or sludge material and must be cleaned periodically.

A variety of conventional procedures have been or are currently being used to remove accumulations of these heavy hydrocarbon materials, most methods involving the use of a solvent or mechanical means to dissolve and wash out the accumulations. Over 50% of the cost of producing and marketing oil from producing wells is related to cleaning procedures required to dissolve and remove paraffin and waxy sludges. The two most common techniques for effecting these cleaning procedures involve the use of mechanical scraping and hot oil flushing. However, the paraffin and wax-like sludges removed from well bores by these techniques usually remain in solid form or otherwise quickly return to a solid after treatment. This undesirable material also tends to accumulate in the flow lines from well bores to storage batteries as well as in the storage batteries themselves.

It has been known to use critical mixtures of certain liquefied petroleum gases, per se, comprising mostly propane to clean wells as shown in Ferguson, Pat. No. 3,477,513. The use of selected hydrocarbons as a solvent, per se, is old, reference Bertese, Pat. No. 3,241,614. Lehmann, Jr., et al., Pat. No. 2,356,254 and Cheng et al., Pat. No. 3,481,870, both teach variously the inclusion of certain additives, such as sulfonates and ethylene glycol for facilitating operability of wall cleaning compositions.

While some of the foregoing conventional processes have met with varying degrees of success, the present invention provides a solvent and method for greatly improving well cleaning operations in addition to effective cleaning of flow and transmission lines as well as petroleum storage tanks where panaffinic and other heavy hydrocarbon materials accumulate.

SUMMARY OF THE PRESENT INVENTION

The present invention is directed to the provision of a solvent for heavy hydrocarbon materials that accumulate in well bores and formations adjacent such well bores. Generally, the solvent includes a liquefied petroleum gas and a normally liquid composition composed of a liquid aromatic hydrocarbon. In the instance of a normally liquid aromatic hydrocarbon for use in combination with the liquid petroleum gas, solvent properties are enhanced by incorporation of a petroleum sulfonate.

It is, therefore, an object of the present invention to provide an improved method for removing paraffin, waxy sludges and the like from oil wells, petroleum pipelines, tanks, etc.

Another object of the present invention is to provide a method whereby paraffin, waxy sludges and other heavy hydrocarbons are removed from well bores, petroleum pipelines and the like by means of an improved solvent composition.

Yet a further object of the present invention is the provision of such a solvent composition that comprises a liquid petroleum gas and a normally liquid composition that includes an aromatic-hydrocarbon, a petroleum sulfonate, and optionally a surfactant and ethylene glycol.

Still another object is the provision of such a solvent wherein the liquefied petroleum gas and a normally liquid composition are present in a volume ratio of between 100:1 to about 500:1 and ideally present in a volume ratio of between about 250:1.

DESCRIPTION OF THE PREFERRED EMBODIMENTS

There are numerous problems associated with the treatment of oil and gas wells, transmission lines, tanks and the like to remove obstructive accumulations of heavy hydrocarbon or paraffinic material. For example, in the use of a solvent type of treatment, a relatively large volume of solvent is required to assure adequate contact with all portions of the system being treated. Furthermore, it is preferable that the solvent be non-acidic, non-alkaline and non-chlorinated to prevent damage to casing, tubing, pumps, sucker rods, packers, etc. Added to these factors are problems of expense since wells having heavily restricted flow generate little income making questionable the justification of expensive cleaning chemicals especially when large volumes of such chemicals are necessary.

The previously recited objectives and attendant criteria are effectively realized by the present invention through the provision of a solvent that comprises a relatively inexpensive liquid petroleum gas with which is mixed a normally liquid composition that includes an aromatic hydrocarbon. It has been found that the ability of the solvent to dissolve the paraffinic or other hydrocarbon materials is greatly enhanced if the aromatic hydrocarbon is combined with a petroleum sulfonate and a surfactant as well as ethylene glycol.

Advantageously and in contradistinction to conventional "critical mixture" LPG (liquid petroleum gas) treatment methods, the LPG of the solvent of the present invention contains butane and/or propane and/or isobutane which are liquid and mixtures thereof. However, other liquefied petroleum gases may be used such as ethane, isobutane, neopentane and mixtures thereof as well as mixtures of those liquefied gases with propane and/or butane. In practice and where there is a mixture of butane and propane, the volume of propane may not exceed 40%. It has been found that the ratio of the volume of LPG to the remaining compositions can be varied successfully over a wide range with as much as 500 volumes of LPG to one volume of remaining ingredients being effective. The preferred ratio based on cost considerations and effectiveness of cleaning action is about 250:1 parts LPG to remaining ingredients.

Normally liquid aromatic hydrocarbons in combination with LPG provide an effective solvent system for such use. The aromatic hydrocarbon component of the composition may be any normally liquid aromatic material. However, the lighter aromatics have such a low flash point that their use creates an explosion problem in handling and storage while the heavier aromatics clean and dissolve the undesired materials more slowly. Therefore, the preferred aromatic according to the present invention is of the toluene type that is sold under the trade name "SC Solvent No. 100" by The Solvents and Chemicals Companies such as the Texas Solvents and Chemical Company in Houston, Tex., U.S.A. The SC Solvent No. 100 is made up almost entirely of aromatics having the toluene structure with an additional radical such as ethyl. However, other aromatics may be used such as toluene, benzene, xylene, ethylbenzene, cumene, mesitylene, propylbenzene and mixtures thereof. Again, however, it will be recognized that flash point and solvency properties may result in one aromatic having preference over another with respect to a given cleaning problem.

It has been found that the combination of LPG with a normally liquid aromatic hydrocarbon and a sulfonate results in a solvent composition that is uniquely suited for cleaning paraffin, waxy sludges and other hydrocarbon residues in the majority of instances. The preferred range of sulfonate to aromatic hydrocarbon is 5% to 35% by weight. A variety of sulfonates may be employed although the preferred comprises a sodium sulfonate such as sodium sulfonate "L-70" distributed by Mineral Oil and Refining Co. of Houston, Tex. Equally preferred is an alkylarylsulfonate such as "Solar 90" which is the trade name for a concentrated anionic product containing 90% alkylarylsulfonate granules. Solar 90 is a product distributed by Swift and Co., Hammond, Ind., U.S.A.

In the instance of the combination of LPG with a normally liquid aromatic hydrocarbon and a sulfonate, a similar proportion of LPG carrier to aromatic hydrocarbon plus sulfonate is satisfactory although the preferred range of LPG to aromatic hydrocarbon plus sulfonate is 250:1. In the combination of the aromatic hydrocarbon with the sulfonate, the amount of aromatic hydrocarbon can vary from 65% to 95% by weight while the amount of sulfonate relative to the aromatic hydrocarbon can range from about 5% to as much as 35% by weight (without regard to the LPG).

When LPG is the carrier, and aromatic hydrocarbon and a sulfonate are combined as the solvent system for use for cleaning purposes, the addition of ethylene glycol while not essential, is advantageous in that the ethylene glycol is believed to act as a stabilizer or a type of catalyst to increase the solvent power of the overall solvent composition. The preferred range of ethylene glycol additive to the 100% combined aromatic hydrocarbon and sulfonate is 1% to 15%. Still further advantages may be obtained in such combination by the addition of a suitable surfactant or surface active agent to increase the cleaning rate of the solvent composition. The preferred range of the surfactant additive to the 100% combined aromatic hydrocarbon and sulfonate is 3% to 12%. For example, a polyoxyethylated nonylphenol may be employed in this capacity. A preferred surfactant is "Igepal CO-630" which is the brand name for a polyethylated nonylphenol derived from nonylphenol combined with ethylene oxide. Igepal CO-630 is distributed by General Aniline and Film Corporation, New York, N.Y., U.S.A.

The volume ratio of LPG to the normally liquid composition may range from about 100:1 to 500:1 for effective results although the preferred ratio is approximately 250:1. In this preferred solvent system, the normally liquid composition in overall percentage includes about 80% by weight of an aromatic hydrocarbon, about 2% by weight of ethylene glycol, about 13% by weight of a sulfonate and about 5% by weight of a surfactant. More specifically, the preferred normally liquid composition includes about 80% by weight of an aromatic hydrocarbon such as SC Solvent No. 100, about 2% by weight of ethyelne glycol, about 13% by weight of alkylarylsulfonate such as Solar 90, about 5% by weight of a polyoxyethylated nonylphenol such as Igepal CO-630, and about 3% by weight of a sodium sulfonate such as Sodium Sulfonate L-70.

For purposes of considering oil wells to be treated according to the present invention, such wells can be classified generally as either pumping wells, flowing wells or gas-lift wells. In treating pumping wells, the solvent system may be injected into the casing in sufficient volume to insure a flow through the casing, into the producing formation, through the pump and into the tubing as will be appreciated by those skilled in the art. When a sufficient return flow into the tubing is accomplished, the treatment can be facilitated by closing the flow line and actuating the well pump to cause a circulation of the mixture through the well for a sufficient period of time such as a few hours.

In treating flowing wells, the treatment is best carried out in at least two stages. A sufficient volume of the solvent system to be used is injected into the tubing so that the solvent reaches a level approximately half way through the portion of tubing that is restricted by the paraffin, waxy sludge deposits or other heavy hydrocarbon material. The well is then opened as will be appreciated by those skilled in the art and allowed to flow until the solvent is completely eliminated from the well and sufficient oil has flowed from the well to carry out the dissolved paraffin and other such material. The well is then again treated by injecting enough solvent into the tubing to reach a level below the portion restricted by the paraffin and waxy sludge.

In treating gas-lift wells, a procedure similar to that with respect to flowing wells is carried out. However, if the gas-lift valves have stuck or been restricted by deposits of paraffin and waxy sludge, they can be cleaned by first injecting the solvent system into the casing. When this has been accomplished, the field gas valves are opened, allowing the solvent to be circulated through the gas-lift valves. When this has been accomplished, the well is then treated in the same manner as a flowing well.

When the solvent system of the present invention is employed to clean flow lines, transmission lines or other pipelines, the preferred procedure is to treat such lines in stages. In this procedure, the solvent is injected into the line in question which is then opened to allow flow followed by further injection of solvent into the line as may be necessary. The volume of solvent utilized and the number of stagings required will vary, of course, according to the diameter and the condition of buildup of material within the line being treated.

When the solvent system according to the present invention is utilized to clean storage tanks and the like, the solvent should be injected into the bottom of the tank by means of a pump. Again, the volume required will vary according to the size and condition of the tank.

The examples that follow will illustrate the foregoing procedures and advantageous results attained thereby in specific instances of use.

Example I

As an example of effectiveness of the solvent system of the present invention in cleaning paraffinic material from the well bore of a pumping well, a volume of 600 gallons of solvent was prepared. The solvent included 250 volumes of carrier LPG per 1 volume of normally liquid composition including about 80% by weight of SC Solvent No. 100, about 2% by weight of ethylene glycol, about 10% by weight of Solar 90, about 5% by weight of Igepal CO-630 and about 3% by weight of Sodium Sulfonate L-70. The volume of 600 gallons of this solvent system was pumped into the casing of each of five pumping wells having an average depth of about 7000 feet, each well being heavily clogged with paraffin of a heavy molecular weight type. The flow lines were closed off and the wells allowed to circulate for approximately 30 minutes. The flow lines were then opened and each well was then able to be placed in normal (pre-pluggage) production. Treatment as just described was necessary only on the average of every 2.5 months whereas cleaning methods employing the "hot oil" technique every month.

Example II

The solvent system and procedure employed according to Example I was repeated in another well also of an average depth of 7000 feet and heavily plugged with paraffinic material. However, the solvent mixture contained 200 volumes of LPG to 1 volume of the normally liquid composition as described in Example I. Again, the well was placed in normal production after only 30 minutes of circulation of the solvent as previously described.

Example III

The solvent composition according to Example I was utilized to clean a flowing well having a depth of about 6000 feet and suffering from a restrictive build up in the tubing by paraffinc material of a very heavy molecular weight type. Because of the excessive buildup of such material, the well was treated in six stages by pumping the solvent into the tubing first in the volume of 65 gallons down to 300 feet; then 125 gallons down to 500 feet; 250 gallons down to 1000 feet; 375 gallons down to 1500 feet; 500 gallons down to 2000 feet; and 75 gallons down to 3000 feet. Following each of these stages, the well was allowed to flow until the dissolved paraffin was eliminated. While only a little paraffin was removed after the first stage, quite large amounts of paraffin were removed following each subsequent stage. In this particular well, a mud tank was employed for visual observation and, following the final stage, the well was opened back into the flow line. On the day following treatment, the well was again closed and a wire-line was run into the tubing which was found to be completely free of paraffin. The treatment as described required only six hours and two persons to carry out the procedures.

Example IV

The solvent mixture or composition according to Example I was used to treat a gas-lift well having a depth of approximately 7000 feet. Prior to treatment, the well and valves therein were severely restricted deposits of paraffin of the high molecular weight type. In treatment, a volume of 192 gallons of the solvent was injected into the casing whereupon the field valve was opened and good circulation of the mixture from the casing into the tubing was obtained. The well was then opened and allowed to flow until the dissolved paraffin was completely removed. The well was then again closed off and 420 gallons of the solvent was injected into the flow line. Then flow was resumed and normal production obtained and remained stable for at least 30 days. Prior to treatment, this well would not receive a 1.5 inch probe below 12 feet while following treatment a 2 inch (full capacity) probe was run without hinderance down to 2000 feet.

Example V

The solvent according to Example I was employed to treat a flowing well having a depth of 6500 feet. Such well was heavily restricted by paraffin of a very hard and dry type. Several attempts to remove this material using conventional cleaning methods, including attempts with LPG under the Ferguson process, had met with very poor success. A volume of 200 gallons of the solvent according to Example I was injected into the casing and the well was opened until the dissolved paraffin was eliminated from the well. The well was again closed off and a volume of 400 gallons of the solvent was injected into the casing. The well was then opened for production and 100% increase in production for a period of 60 known days was obtained over and above production prior to treatment.

Example VI

A solvent composition was prepared having 250 volume of LPG to one volume of normally liquid composition. The normally liquid composition included approximately 86% by weight of SC Solvent No. 100 and approximately 14% by weight of liquid petroleum sulfonate, primarily sodium sulfonate. Such mixture was used to clean a pumping well having a depth of 5200 feet and caked by paraffin of a dry, hard, asphalt type. Prior to treatment, the well produced 80% salt water and had no bottom hole pressure. The well had been difficult to treat by conventional means due to the type of paraffin involved. In treatment, and because of the absence of bottom hole pressure, it was necessary to pump the solvent into the casing at a rapid rate to prevent a vapor-lock of the pump. A volume of 600 gallons of the solvent mixture was injected into the casing and the flow line was closed and the well circulated for a period of seven hours. Upon opening the flow line and placing the well in production, an increase of 15% in production was obtained for a period of 45 known days.

Example VII

To illustrate utility of the solvent of the present invention for cleaning oil transmission lines, a network of transmission lines covering a total distance of 25 miles with an average of one-half mile per line required cleaning. These lines ranged in size from four inches to 12 inches in diameter and previous efforts to clean the lines with hot oil had failed. Similarly, previous efforts to clean the lines using a critical mixture of butane and propane under the Ferguson concept were unsuccessful and the lines had to be cleaned mechanically using "pigs" every two weeks at an expense of approximately $30,000 per year for maintenance of line pumps. These transmission lines were cleaned by means of the solvent according to Example I which was pumped directly into the transmission lines downstream of the line pumps. A total of 22,000 gallons of the solvent was used in the entire 25 mile network. After this treatment, a pig was run through all of the lines and no accumulation of paraffin was found. Effectiveness of this cleaning operation is illustrated by the fact that the pig method of cleaning resulted in each line pump pumping at only a rate of two barrels per minute while the cleaning method according to the present invention resulted in a pumping rate by each line pump of four barrels per minute which was the full capacity of the line pumps. It is estimated that the total time necessary for cleaning these lines by conventional means would have been five to six weeks at a cost of approximately $7,000. By using the method according to the present invention as just described, the cleaning technique required a total of 47 man hours at a cost of only approximately $1,300.

Example VIII

As an illustration of utility of the solvent system according to the present invention for cleaning plugged flow lines, a flow line 1.25 miles in length was heavily clogged with high molecular weight paraffin. Previous attempts had been made to clean the line with hot oil and not only had the latest hot oil technique failed but it created a .25 mile long paraffin plug. Under these circumstances, 420 gallons of solvent according to Example I was pumped directly into the line at a slow rate and in a short time the plug began moving and the line was cleaned completely.

Example IX

As an example of still other utility of the solvent system according to the present invention, the solvent was used to remove a wire-line that was stuck at a depth of 500 feet in an oil well heavily clogged with a gummy type of paraffin. At the 500 foot depth, the wire-line was approximately 100 feet in the paraffin. A connection was made into a bleeder valve and the solvent according to Example I was pumped through such connection into the tubing. By pumping very slowly, solvent moved around and through the paraffin that was holding the wire-line. When pressure of the solvent built to 800 pounds, steady tension was placed on the wire-line (to which was attached a paraffin knife) and the flow line bleeder valve was opened while the valve from the tubing to the flow line was partially opened. As pressure dropped from 800 pounds to 650 pounds, the wire-line and paraffin knife began moving to the surface and ultimately came out of the well. Only two persons were required to carry out the solvent injection and the treatment time involved only approximately an elapse of ten minutes. It was estimated that the solvent technique according to the present invention resulted in a savings of at least $2500 over other techniques for removing the wire-line.

We claim:

1. A solvent for paraffin, waxy sludges and the like of petroleum origin, comprising:
   (A) a liquid petroleum gas carrier, the gas comprising at least the one gas butane and not more than 40% propane;
   (B) a normally liquid composition including as components thereof the following in their relative percentages by weight:
   (i) between 65% and 95% by weight of a normally liquid aromatic hydrocarbon;
   (ii) between 5% and 35% by weight of a sulfonate selected from the group consisting of alkylaryl sulfonates; the respective ratios of liquid petroleum gas to liquid composition being at between 100:1 and 500:1 parts by volume thereof.

2. The solvent of claim 1 wherein the liquid petroleum gas (a) is selected from the group consisting of ethane, propane, isobutane, butane, neopentane and mixtures thereof.

3. The solvent of claim 1 wherein the normally liquid aromatic hydrocarbon (b) (i) is selected from the group consisting of toluene, benzene, xylene, ethylbenzene, cumene, mesitylene, propylbenzene and mixtures thereof.

4. The solvent of claim 1 wherein the sulfonate comprises sodium sulfonate.

5. A solvent for paraffin, waxy sludges and the like of petroleum origin, comprising:
   (A) a liquified petroleum gas carrier, which contains both butane and not more than 40% by volume propane;
   (B) a normally liquid composition including:
   (i) about 80% by weight of a normally liquid aromatic hydrocarbon,
   (ii) about 2% by weight of ethylene glycol,
   (iii) about 10% by weight of an alkylarylsulfonate,
   (iv) about 5% by weight of a polyoxyethylated nonylphenol, and
   (v) about 3% by weight of a petroleum sulfonate;
   the respective ratio of said liquified petroleum gas carrier to said normally liquid composition being at between 100 parts to 1 part and 500 parts to 1 part by volume respectively.

References Cited

UNITED STATES PATENTS

| | | | |
|---|---|---|---|
| 2,699,832 | 1/1955 | Allen | 166—304 |
| 3,477,513 | 11/1969 | Ferguson | 252—8.55 B X |
| 3,241,614 | 3/1966 | Bertness | 166—304 |
| 2,356,254 | 8/1944 | Lehmann, Jr., et al. | 252—8.55 D |
| 3,481,870 | 12/1969 | Cheng et al. | 252—8.55 B X |

RICHARD D. LOVERING, Primary Examiner

U.S. Cl. X.R.

166—304; 252—364